United States Patent
Shimizu et al.

(10) Patent No.: US 7,682,679 B2
(45) Date of Patent: Mar. 23, 2010

(54) OPTICAL INFORMATION RECORDING MEDIUM AND METHOD OF MANUFACTURING THE SAME

(75) Inventors: Hironobu Shimizu, Haruna-Machi (JP); Daisuke Morishita, Haruna-Machi (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 1142 days.

(21) Appl. No.: 11/192,921

(22) Filed: Jul. 29, 2005

(65) Prior Publication Data

US 2006/0023617 A1    Feb. 2, 2006

(30) Foreign Application Priority Data

Jul. 30, 2004    (JP)    ............... 2004-224805

(51) Int. Cl.
*B32B 3/02*    (2006.01)
(52) U.S. Cl. ................ 428/64.4; 428/64.8; 430/270.18
(58) Field of Classification Search ................ 428/64.4, 428/64.8; 430/270.18, 270.2
See application file for complete search history.

(56) References Cited

U.S. PATENT DOCUMENTS

| | | | |
|---|---|---|---|
| 5,274,623 A | 12/1993 | Usami et al. | |
| 5,316,899 A | 5/1994 | Miyadera et al. | |
| 6,150,067 A * | 11/2000 | Koike et al. | ................ 430/159 |
| 2005/0094546 A1 * | 5/2005 | Katayama et al. | ........ 369/275.3 |

FOREIGN PATENT DOCUMENTS

| | | |
|---|---|---|
| EP | 0 467 716 A2 | 1/1992 |
| EP | 1 530 209 A1 | 5/2005 |
| JP | 2002036726 A * | 2/2002 |
| JP | 2003-331465 A | 11/2003 |
| JP | 2005-141809 | 6/2005 |
| WO | WO 01/47719 * | 7/2001 |
| WO | WO 2005/017886 A2 | 2/2005 |

* cited by examiner

*Primary Examiner*—Elizabeth Mulvaney
(74) *Attorney, Agent, or Firm*—Law Office of Katsuhiro Arai

(57) ABSTRACT

A dye or dyes are selected, which are capable of absorbing a laser beam with a wavelength of 350 to 500 nm and are capable of recording sub-information using a laser beam with a wavelength of 640 to 680 nm or 750 to 830 nm. An optical information recording medium including the optical recording layer records sub-information (BCA information) of a type different from that of main information (data information) in a sub-information region (a BCA recording region) different from a main information area (a data area) using a laser beam.

3 Claims, 10 Drawing Sheets

OPTICAL INFORMATION RECORDING MEDIUM AND METHOD OF MANUFACTURING THE SAME

BACKGROUND OF THE INVENTION

1. Field of the Invention

The present invention relates to an optical information recording medium and a method of manufacturing the same, and in particular to an optical information recording medium for performing recording by a laser beam (blue laser) with a wavelength of 350 to 500 nm and a method of manufacturing the same.

2. Description of the Related Art

Conventionally, in addition to an optical information recording medium for performing recording and reproduction of optical information using a laser beam, that is, a CD using red laser light with a wavelength of 750 to 830 nm (e.g., around 780 nm) or a DVD using short wavelength red laser light with a wavelength of 640 to 680 nm (e.g., 650 to 665 nm), a blue laser disc (BD or HD-DVD), which can make it possible to record and reproduce high-density optical information at high speed by using a blue laser with a wavelength as short as 350 to 500 nm (e.g., around 405 nm), has been actively developed (see, for example, JP-A-2003-331465).

As one of standards concerning the blue laser disc (BD or HD-DVD), it is provided that BCA is performed.

FIG. 14 is a schematic plan view of an optical information recording medium 1 using the blue laser disc (in particular, HD-DVD) FIG. 15 is a schematic sectional view thereof.

The optical information recording medium 1 includes, in particular, as shown in FIG. 15, a translucent substrate 2, an optical recording layer 3 (a light-absorbing layer) formed on the substrate 2, a light reflection layer 4 formed on the optical recording layer 3, a protective layer 5 (an adhesive layer) formed on the light reflection layer 4, and a dummy substrate 6 stacked on an upper layer on the protective layer 5 at a predetermined thickness. The optical information recording medium 1 is formed at a predetermined thickness required by standards.

Spiral pre-grooves 7 are formed in the substrate 2. Portions other than the pre-grooves 7, that is, lands 8 are located on the left and the right of the pre-groove 7.

A laser beam 9 is irradiated from the substrate 2 side, whereby the optical recording layer 3 absorbs energy of the laser beam 9 to generate heat. Recording pits 10 are formed by thermal decomposition of the optical recording layer 3 to make it possible to record information in the optical recording layer 3.

As the translucent substrate 2, a material with high transparency with a refractive index with respect to the laser beam 9 in a range of, for example, about 1.5 to 1.7, having thickness of about 1.1 mm, and excellent in impact resistance, which is formed mainly of resin, for example, polycarbonate, a glass plate, an acrylic plate, or an epoxy plate is used.

The optical recording layer 3 is a layer consisting of a light-absorbing material containing dyes formed on the substrate 2. When the laser beam 9 is irradiated, heat generation, melting, sublimation, deformation, or modification is caused in the optical recording layer 3. The optical recording layer 3 is formed by uniformly coating a dye or the like dissolved by a solvent over the surface of the substrate 2 with means such as spin coating.

An arbitrary optical recording material can be adopted as a material used for the optical recording layer 3. However, the material is desirably a light-absorbing organic dye and is required to have a refractive index n exceeding 1.9 in an absorption wavelength area of the laser beam 9.

The light reflection layer 4 is a metal film with high thermal conductivity and light reflectivity. The light reflection layer 4 is formed from gold, silver, copper, aluminum, or an alloy containing these metals by means such as evaporation or sputtering.

The protective layer 5 is formed from resin excellent in impact resistance and adhesiveness, which is the same as the material used for the substrate 2. For example, the protective layer is formed by applying ultraviolet curing resin on the light reflection layer 4 with spin coating and irradiating ultraviolet rays to harden the ultraviolet curing resin.

The dummy substrate 6 is formed of the same material as the substrate 2.

As shown in, in particular, FIG. 14, a sub-information area 12 (a BCA area), a system read-in area 13, and a main information area 14 (a data area) can be defined two-dimensionally and concentrically from a center hole 11 of the optical information recording medium 1 (the substrate 2) toward an outer peripheral side.

The BCA (Burst Cutting Area) recording forms a recording area (the sub-information area 12) formed of barcodes 15 near the center of the disc (the optical information recording medium 1), and records key information and the like in the barcodes 15 using the laser beam 9 to make it possible to, for example, represent a serial number of the disk and prevent illegal copy of the disk. Sub-information is not limited to information according to the BCA. A sub-information area is not limited to the BCA area.

Note that a section of the sub-information area 12 and the main information area 14 has a structure shown in FIG. 15 and makes the barcodes 15 recordable according to absorption of the laser beam 9 by the optical recording layer 3 in the sub-information area 12.

The system read-in area 13 is located on an outer peripheral side of the sub-information area 12. The system read-in area 13 performs information recording by embossed pits.

The main information area 14 is an area that is located further on the outer peripheral side of the system read-in area 13 at a predetermined interval and used for recording and reproduction of usual optical information (data information) by the laser beam 9 used by general users. The main information is not limited to information recorded in the main information area 14 (the data area), that is, this data information recorded by the general users.

At a stage of shipment from a factory, in the optical information recording medium 1, information is written in both the sub-information area 12 and the system read-in area 13 by a writing device for BCA and an embossing device (not shown). There is a problem in that it is necessary to perform the BCA (sub-information recording), in particular, in the sub-information area 12 according to barcode recording after forming the optical recording layer 3, the light reflection layer 4, the protective layer 5, and the dummy substrate 6 on the substrate 2 independently of a stamping process for forming the pre-grooves 7 and the lands 8 in the substrate 2.

These problems are common to blue laser discs (BDs) of other types.

FIG. 16 is a schematic sectional view of an optical information recording medium 20 using the blue laser disc (in particular, BD).

As shown in the figure, the optical information recording medium 20 includes the transparent 2, the light reflection layer 4, the optical recording layer 3, the protective layer 5, an adhesive layer 21, and a cover layer 22. A plan view thereof is substantially identical with that of the optical information recording medium 1 (FIG. 14). Note that an inorganic layer may be added on the surface of the protective layer 5 or the adhesive layer 21.

The adhesive layer 21 sticks the cover layer 22 with thickness of about 0.1 mm to the protective layer 5.

When the laser beam 9 is irradiated from the cover layer 22 side, the optical recording layer 3 absorbs energy of the laser beam 9 to generate heat. Recording pits 10 is formed in the pre-grooves 7 or the lands 8 according to thermal decomposition of the optical recording layer 3 to make it possible to record information in the optical recording layer 3.

FIG. 17 is a graph (absorption spectra) of absorbance of respective discs (a CD, a DVD, a BD, and an HD-DVD) with respect to a wavelength of the laser beam 9. In addition to these spectra, a refractive index n of the optical recording layer 3 and an output for BCA (laser power) are also plotted on the graph.

Concerning the refractive index n, in all the cases of the CD, the DVD, the BD, and the HD-DVD, a maximum value of the refractive index n with respect to a laser beam wavelength of the optical recording layer 3 is located on a long wavelength side of respective absorption peaks. In order to obtain sufficient percentage modulation in optical recording (i.e., in order to set a variation An of the refractive index n large), the refractive index n is required to be large. All of the CD, the DVD, the BD, and the HD-DVD perform data logging in the main information area 14 according to absorption on the long wavelength side of the absorption peaks.

As shown in the figure, since the barcodes 15 have a large area compared with the recording pits 10, in order to write the barcodes 15 for BCA, a laser with power (about 1000 mW) larger than laser power (about 100 mW) for usual data writing in the main information area 14 is required. However, as an oscillation source (semiconductor) for a blue laser for a BD and an HD-DVD, an oscillation source having sufficient power has not be developed yet (maximum power is about 200 mW at present). Thus, in order to perform the BCA, an oscillation source of a red laser beam already used for a CD or a DVD (a red laser beam for a CD or a short wavelength red laser beam for a DVD, hereinafter referred to as "red laser") is used under the present circumstances.

Therefore, in the identical disc (the optical information recording medium 1 (FIG. 15) or the optical information recording medium 20 (FIG. 16)), wavelengths of oscillation lasers using semiconductors are different in the barcode recording (the sub-information recording) in the sub-information area 12 and the data logging (main information recording) in the main information area 14. Thus, there is a problem in that it is necessary to contrive characteristics of the optical recording layer 3 of the optical information recording medium 1 or 20.

SUMMARY OF THE INVENTION

The invention has been devised in view of one or more of the problems and in an embodiment, it is an object of the invention to provide an optical information recording medium that is capable of realizing BCA required in standards of blue laser discs (a BD and an HD-DVD) using a blue laser and a method of manufacturing the same.

In an embodiment, it is another object of the invention to provide an optical information recording medium that has slight record sensitivity to a red laser while securing or improving record sensitivity to a blue laser and a method of manufacturing the same.

In an embodiment, it is still another object of the invention to provide an optical information recording medium that makes it possible to perform both main information recording (data logging) in a main information area by a blue laser and sub-information recording BCA) in a sub-information area by a red laser and a method of manufacturing the same.

In an embodiment, it is still another object of the invention to provide an optical information recording medium that makes it possible to perform both data logging in a main information area with low power by a blue laser and BCA in a sub-information area with high power by a red laser and a method of manufacturing the same.

In an embodiment, it is still another object of the invention to provide an optical information recording medium that makes it possible to perform data logging using pits in a main information area with low power and BCA using the barcodes 15 in a sub-information area with high power and a method of manufacturing the same.

The invention is generally intended to aim at selecting a dye, which has an absorption peak further on a short wavelength side than a recording wavelength of a wavelength area of a blue laser and also has an absorption spectrum in a wavelength area of a red laser, as a light-absorbing material. An optical information recording medium according to a first aspect of the invention is an optical information recording medium that includes a substrate having translucency, an optical recording layer containing a light-absorbing material formed of a dye that absorbs a laser beam, and a light reflection layer reflecting the laser beam and includes a main information area capable of recording main information that is optically readable by irradiating the laser beam on the optical recording layer. The optical information recording medium makes it possible to record sub-information of a type different from that of the main information in a sub-information area different from the main information area using the laser beam. The optical recording layer is capable of absorbing the laser beam with a wavelength of 350 to 500 nm and is capable of recording the sub-information in the sub-information area using the laser beam with a wavelength of 640 to 680 nm or 750 to 830 nm. In at least one embodiment of the invention, since the elements described above are provided, record sensitivity is improved remarkably. When information is recorded in the main information area using the laser beam with a wavelength of 350 to 500 nm, even if the laser beam is irradiated with low power (10 mW or less), contrast necessary for recording can be secured. In addition, sensitivity for the sub-information area can also be improved. Therefore, it is possible to form not only BCA but also information of an ID unit of a medium and grant identity using the conventional high-power laser (with a wavelength of 640 to 680 nm or 750 to 830 nm).

A method of manufacturing an optical information recording medium according to a second aspect of the invention is a method of manufacturing an optical information recording medium that includes a substrate having translucency, an optical recording layer containing a light-absorbing material formed of a dye that absorbs a laser beam, and a light reflection layer reflecting the laser beam and includes a main information area capable of recording main information that is optically readable by irradiating the laser beam on the optical recording layer. The method of manufacturing an optical information recording medium forms the optical recording layer by applying a mixed dye, which includes a first dye capable of absorbing the laser beams with a wavelength of 350 to 500 nm and a second dye capable of absorbing the laser beam with a wavelength of at least 640 to 680 nm or 750 to 830 nm and having a ratio to the first dye of 20 weight % or less, on the substrate directly or via another layer.

A method of manufacturing an optical information recording medium according to a third aspect of the invention is a method of manufacturing an optical information recording medium that includes a substrate having translucency, an optical recording layer containing a light-absorbing material formed of a dye that absorbs a laser beam, and a light reflection layer reflecting the laser beam and includes a main information area capable of recording main information that is optically readable by irradiating the laser beam on the optical recording layer. The method of manufacturing an optical information recording medium forms the optical recording layer by applying a first dye capable absorbing the laser beam with a wavelength of 350 to 500 nm to the substrate directly or via another layer to thereby form the optical recording layer and, then, applying a second dye capable of absorbing the laser beam with a wavelength of at least 640 to 680 nm or 750 to 830 nm to a sub-information area different from the main information region or by applying the second dye capable of absorbing the laser beam with a wavelength of at least 640 to 680 nm or 750 to 830 nm to the sub-information area different from the main information area and, then, applying the first dye capable of absorbing the laser beam with a wavelength of 350 to 500 nm to the substrate directly or via another layer.

According to the manufacturing methods of the second and the third aspects of the invention, it is possible to obtain the first optical information recording medium suitably.

The light-absorbing material is capable of absorbing the laser beam with a wavelength of 350 to 500 nm and recording information in the optical recording layer of the main information area and capable of absorbing the laser beam with a wavelength of at least 640 to 680 nm or 750 top 830 nm and applying BCA to the optical recording layer of the sub-information area.

The light-absorbing material can contain a single dye.

The light-absorbing material can contain a first dye capable of absorbing the laser beam with a wavelength of 350 to 500 nm and recording information in the optical recording layer and a second dye capable of performing BCA using the laser beam with a wavelength of at least 640 to 680 nm or 750 to 830 nm.

The light-absorbing material can contain a phthalocyanine dye of a structural formula described below.

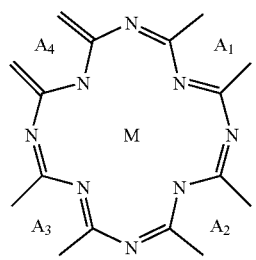

(In the formula, M represents a diatomic hydrogen atom, a diatomic metal atom, a trivalent or quadrivalent substitutional metal atom, or oxy-metal, and A1, A2, A3, and A4 represent substituents, respectively.)

The light-absorbing material can contain an oxacyanine dye of a structural formula described below and an azo dye of a structural formula described below.

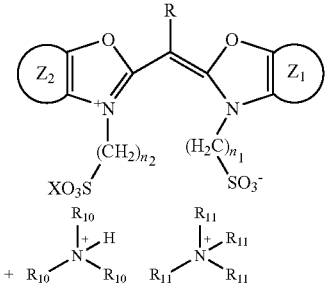

(In the formula, Z1 and Z2 represent a group of atoms necessary for forming a five or six-membered aromatic ring and nitrogen-containing heterocyclic ring, which may include a substituent. R represents a hydrogen atom, halogen, or aliphatic group, an aromatic group, or a heterocyclic ring group. R10 and R11 represent any one of methyl group, ethyl group, propyl group, butyl group, pentyl group, and hexyl group, respectively. X represents an ion necessary for neutralizing electrical charges in a molecule. N1 and n2 represent numbers of alkyl chains, which are represented by an integer from 1 to 20, respectively.)

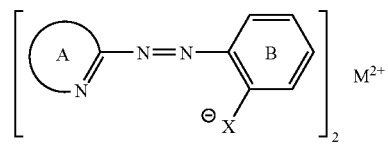

(In the formula, a ring A represents a heterocyclic ring formed together with a carbon atom and a nitrogen atom to which the ring A is bonded. A ring B represents an aromatic ring that may be substituted or condensed. X represents a group that can contain active hydrogen. In addition, X represents a metal complex obtained by one molecule of a bivalent positive metal ion ($M^{2+}$) to two molecules of this azo dye.)

The light-absorbing material can contain an oxacyanine dye of a structural formula described below and a cyanine dye of a structural formula described below.

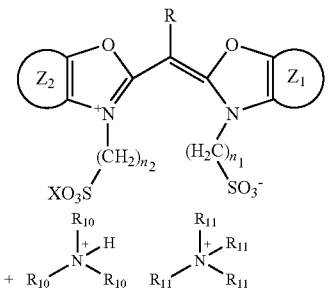

(In the formula, Z1 and Z2 represent a group of atoms necessary for forming a five or six-membered aromatic ring and nitrogen-containing heterocyclic ring, which may include a substituent. R represents a hydrogen atom, halogen, or aliphatic group, an aromatic group, or a heterocyclic ring group.

R10 and R11 represent any one of methyl group, ethyl group, propyl group, butyl group, pentyl group, and hexyl group, respectively. X represents an ion necessary for neutralizing electrical charges in a molecule. N1 and n2 represent numbers of alkyl chains, which are represented by an integer from 1 to 20, respectively.)

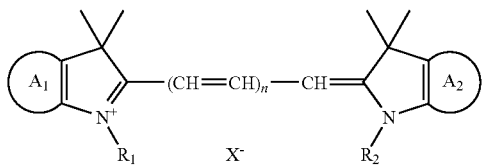

(Note that n indicates an integer of 1 or 2, A1 and A2 indicate a benzene ring having a phenyl-ethylene group as a substituent, R1 and R2 indicate alkyl or an alkali metal ion or an alkyl sulfonic acid group bonded with alkyl group, and $X^-$ represents a negative ion of an halogen atom, perchloric acid, boron hydrofluoric acid, or toluenesulfonic acid. When R1 and R2 have groups bonded with alkali metal ions, $X^-$ does not have to be present.)

The light-absorbing material can contain an oxacyanine dye of a structural formula described below and a phthalocyanine dye of a structural formula described below.

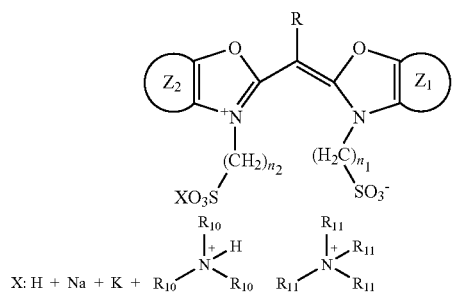

(In the formula, Z1 and Z2 represent a group of atoms necessary for forming a five or six-membered aromatic ring and nitrogen-containing heterocyclic ring, which may include a substituent. R represents a hydrogen atom, halogen, or aliphatic group, an aromatic group, or a heterocyclic ring group. R10 and R11 represent any one of methyl group, ethyl group, propyl group, butyl group, pentyl group, and hexyl group, respectively. X represents an ion necessary for neutralizing electrical charges in a molecule. N1 and n2 represent numbers of alkyl chains, which are represented by an integer from 1 to 20, respectively.)

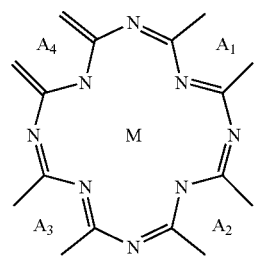

(In the formula, M represents Cu, Pd, or Co, and A1, A2, A3, and A4 represent substituents independently.)

A ratio of the second dye to the first dye can be 20 weight % or less, preferably, 5 to 10 weight %. If a dye is too much, the dye adversely affects an electrical characteristic of a main recording area and recording cannot be performed properly in some cases. If a dye is too little, a recording characteristic by a low power output laser of the invention cannot be obtained in some cases. In all of the aforesaid embodiments, any element used in an embodiment can interchangeably be used in another embodiment unless such a replacement is not feasible or causes adverse effect. Further, the present invention can equally be applied to products and methods.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DESCRIPTION OF THE EMBODIMENTS

Figure 1:
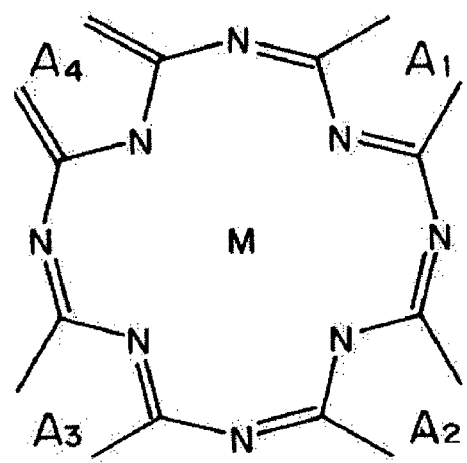
FIG. 1 is a diagram explaining a structural formula of a dye (a phthalocyanine dye) used for the optical recording layer 3 of an optical information recording medium according to a first embodiment of the invention, wherein m represents a diatomic hydrogen atom, a diatomic metal atom, a trivalent or quadrivalent substitutional metal atom, or oxy-metal, and a1, a2, a3, and a4 represent substituents, respectively.

The present invention will be explained with reference to preferred embodiments. However, the preferred embodiments are not intended to limit the invention.

In at least one embodiment of the invention, since a dye absorbing both a blue laser and a red laser is selected, an optical information recording medium, which makes it possible to also perform sub-information recording such as BCA by a red laser to satisfy BD standards, and a method of manufacturing the same can be realized.

An optical information recording medium according to a first embodiment of the invention will be explained with reference to FIGS. 1 and 2. Note that portions same as those in FIGS. 14 to 17 are denoted by the identical reference numerals and signs, and detailed descriptions of the portions are omitted.

Figure 14:
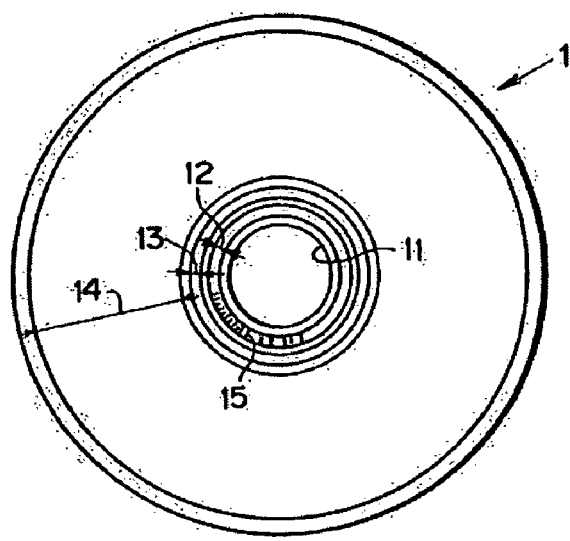
FIG. 14 is a schematic plan view of the optical information recording medium 1 using a blue laser disc (HD-DVD)
Figure 15:
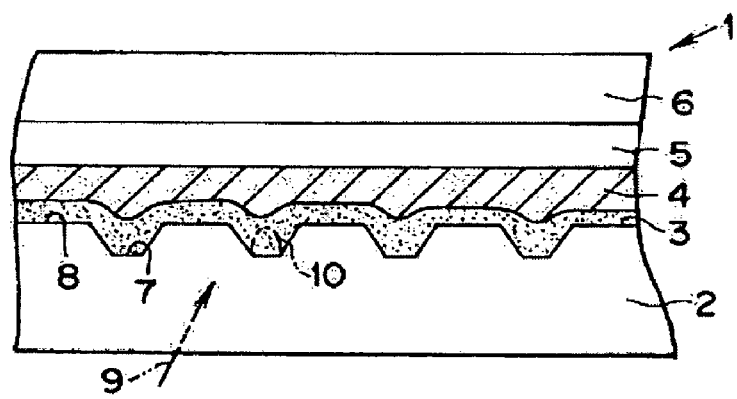
FIG. 15 is a schematic sectional view of the optical information recording medium 1 using a blue laser disc (HD-DVD)

A two-dimensional structure and a sectional structure of this optical information recording medium are the same as those of the conventional optical information recording media 1 and 20 shown in FIGS. 14 and 15 (or 16). However, a dye used for the optical recording layer 3 is different form that used in the conventional optical information recording media 1 and 20.

FIG. 1 is a diagram explaining a structural formula of a dye (a phthalocyanine dye) used for the optical recording layer 3 of the optical information recording medium according to the first embodiment.

Figure 2:
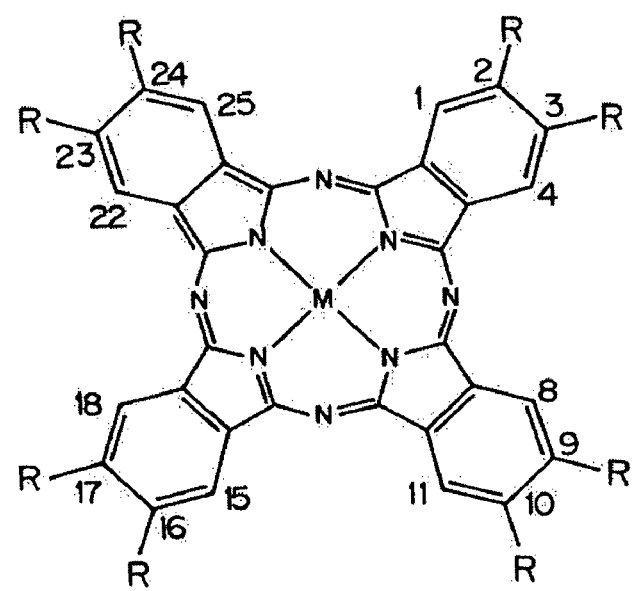
FIG. 2 is a diagram explaining a structural formula of an example of the phthalocyanine dye (a phthalocyanine derivative, 2, 9, 16, 22-tetra-monomethyle-amino-cobalt (II) phthalocyanine) used for the optical recording layer 3 of the optical information recording medium according to the first embodiment, wherein m is co and r is mehn- or monomethyl amino group.

FIG. 2 is a diagram explaining a structural formula of an example of the phthalocyanine dye (a phthalocyanine derivative). This derivative is called 2, 9, 16, 22-tetra-monomethyle-amino-cobalt (II) phthalocyanine).

Figure 3:
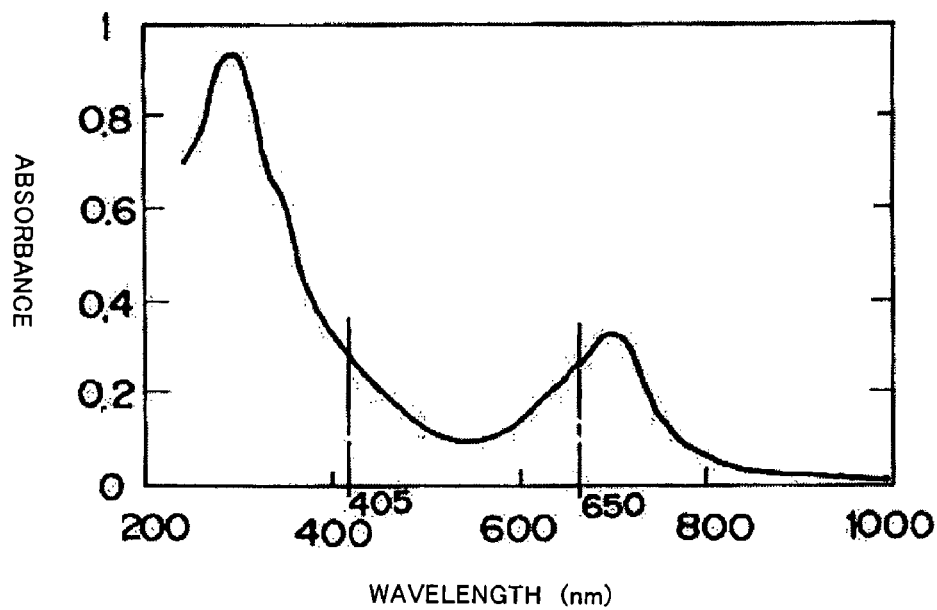
FIG. 3 is a graph of absorbance of the phthalocyanine dye (the phthalocyanine derivative, FIG. 2) with respect to a wavelength of the laser beam 9 according to the embodiment.

FIG. 3 is a graph of absorbance of the phthalocyanine dye (the phthalocyanine derivative, FIG. 2) with respect to a wavelength of the laser beam 9. Although the phthalocyanine dye is a single pigment, the phthalocyanine dye has an absorption spectrum in a wavelength area of a blue laser. In particular, the phthalocyanine dye has an absorption peak on a short wavelength side of a recording wavelength and is capable of obtaining a high refractive index n.

The phthalocyanine dye is capable of absorbing light near a recording wavelength 405 nm of the blue laser. In addition, the phthalocyanine dye also has a lower absorption peak in a wavelength area of a red laser near a wavelength of 650 nm and is capable of absorbing the red laser.

When the phthalocyanine dye having such a constitution is used for the optical recording layer 3, a general user is capable of applying main information recording (data logging) using the blue laser to the optical recording layer 3 in the main information area 14 (data area) In addition, it is possible to apply sub-information recording ( BCA) with high power using the red laser to the sub-information area 12 (the BCA region) at a stage of shipment from a factory.

Therefore, even if a writing device for BCA using the blue laser or a high-power laser oscillation unit therefor is not provided, it is possible to manufacture a product that realizes BCA by the conventional writing device for BCA using the red laser and satisfies standards of the blue laser disks (a BD and an HD-DVD).

Figure 16:
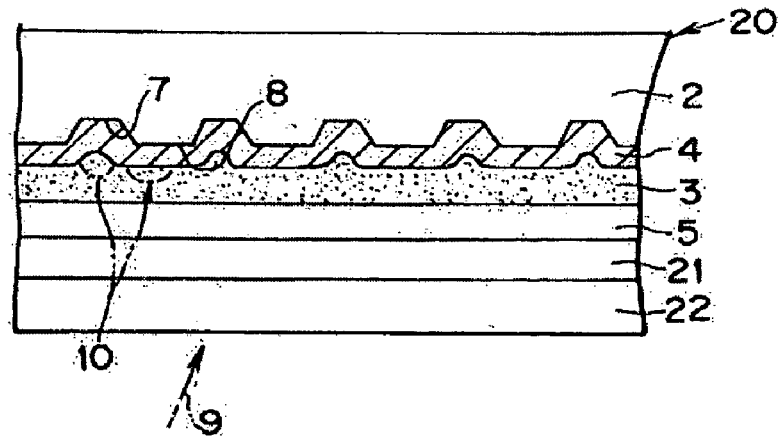
FIG. 16 is a schematic sectional view of the optical information recording medium 20 using another blue laser disc (BD)
Figure 17:
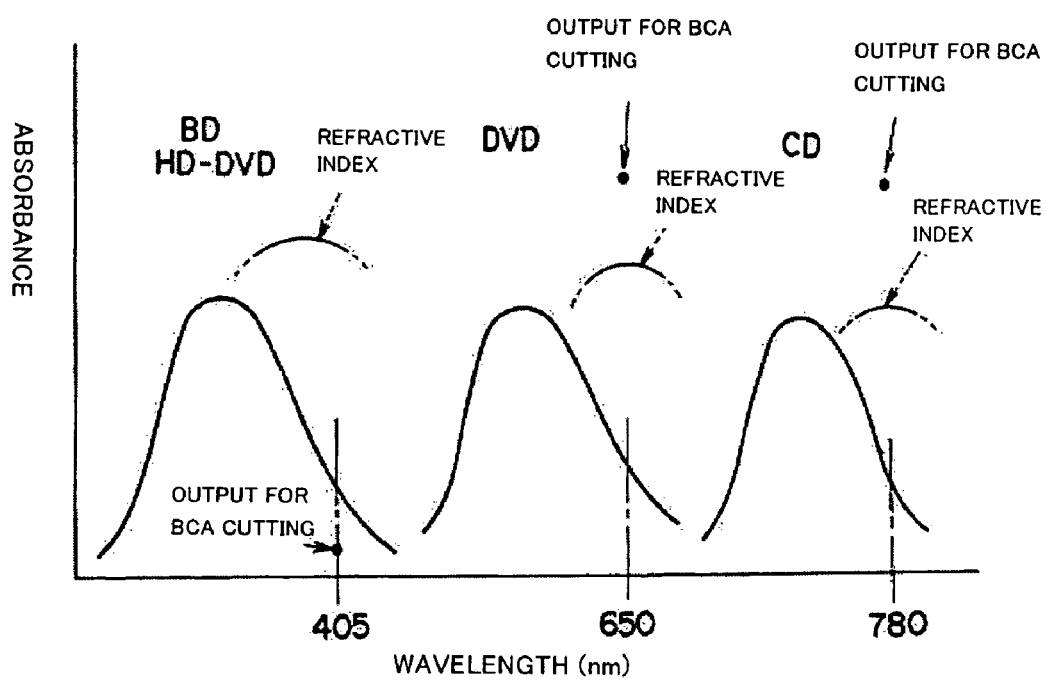
FIG. 17 is a graph of absorbance of discs (a CD, a DVD, a BD, and an HD-DVD) with respect to a wavelength of a laser beam.

Note that, for example, in order to form the optical recording layer 3 containing the phthalocyanine dye on the substrate 2 directly as in the optical information recording medium 1 in FIG. 15 or in order to form the optical recording layer 3 on the substrate 2 via another layer (e.g., the light reflection layer 4) as in the optical information recording medium 20 in FIG. 16, a dye solution obtained by dissolving the dye in a solvent is applied to the substrate 2 by spin coating.

In both the case, it is possible to uniformly apply the dye solution over the sub-information area 12, the system read-in area 13, and the main information area 14 on the substrate 2.

In at least one embodiment of the invention, it is possible to select a single dye such as the phthalocyanine dye that has two absorption peaks (FIG. 3). It is also possible to obtain two absorption peaks using two or more dyes. Specifically, it is possible to obtain a blue laser disk, which satisfies BD standards for BCA, by adding a small amount of a material having an absorption spectrum in a wavelength are of a red laser to a material with high sensitivity to a blue laser.

Figure 4:
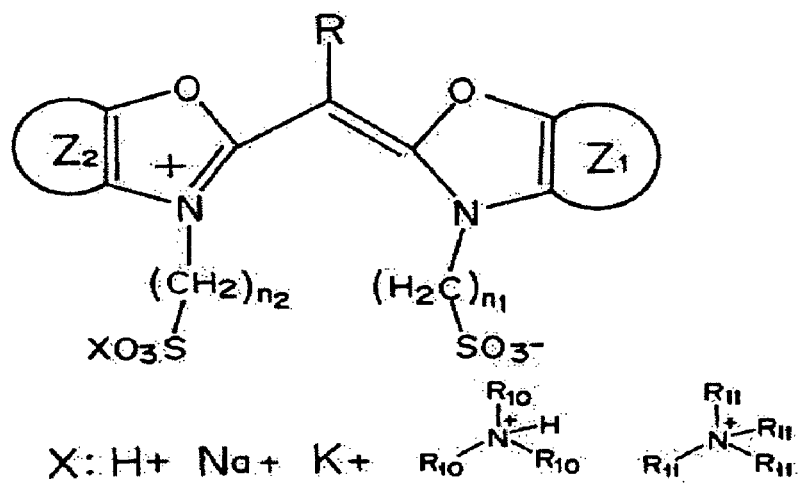
FIG. 4 is a diagram explaining a structural formula of a first dye (a base dye, an oxacyanine dye) used for the optical recording layer 3 of an optical information recording medium according to a second embodiment of the invention, wherein z1 and z2 represent a group of atoms necessary for forming a five or six-membered aromatic ring and nitrogen-containing heterocyclic ring, which may include a substituent: r represents a hydrogen atom, halogen, or aliphatic group, an aromatic group, or a heterocyclic ring group: r10 and r11 represent any one of methyl group, ethyl group, propyl group, butyl group, pentyl group, and hexyl group, respectively: x represents an ion necessary for neutralizing electrical charges in a molecule: n1 and n2 represent numbers of alkyl chains, which are represented by an integer from 1 to 20. respectively.
Figure 5:
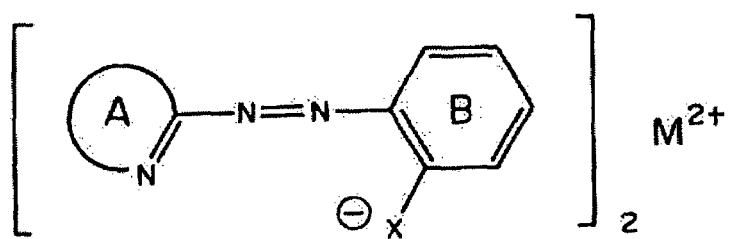
FIG. 5 is a diagram explaining a structural formula of a second dye (an additive dye, an azo dye) used for the optical recording layer 3 of the optical information recording medium according to the second embodiment, wherein a ring a represents a heterocyclic ring formed together with a carbon atom and a nitrogen atom to which the ring a is bonded; a ring b represents an aromatic ring that may be substituted or condensed; x represents a group that can contain active hydrogen; in addition, x represents a metal complex obtained by one molecule of a bivalent positive metal ion ($m^{2+}$) to two molecules of this azo dye.

FIG. 4 is a diagram explaining a structural formula of a first dye (a base dye, an oxacyanine dye) used for the optical recording layer 3 of an optical information recording medium according to a second embodiment of the invention. FIG. 5 is a diagram explaining a structural formula of a second dye (an additive dye, an azo dye) used for the optical recording layer 3 of the optical information recording medium according to the second embodiment.

Note that, like the optical information recording medium according to the first embodiment, a two-dimensional structure and a sectional structure of the optical information recording medium according to the second embodiment are the same as those of the conventional optical information recording media 1 and 20 shown in FIGS. 14 and 15 (or 16). However, a dye used for the optical recording layer 3 is different form that used in the conventional optical information recording media 1 and 20.

Figure 6:
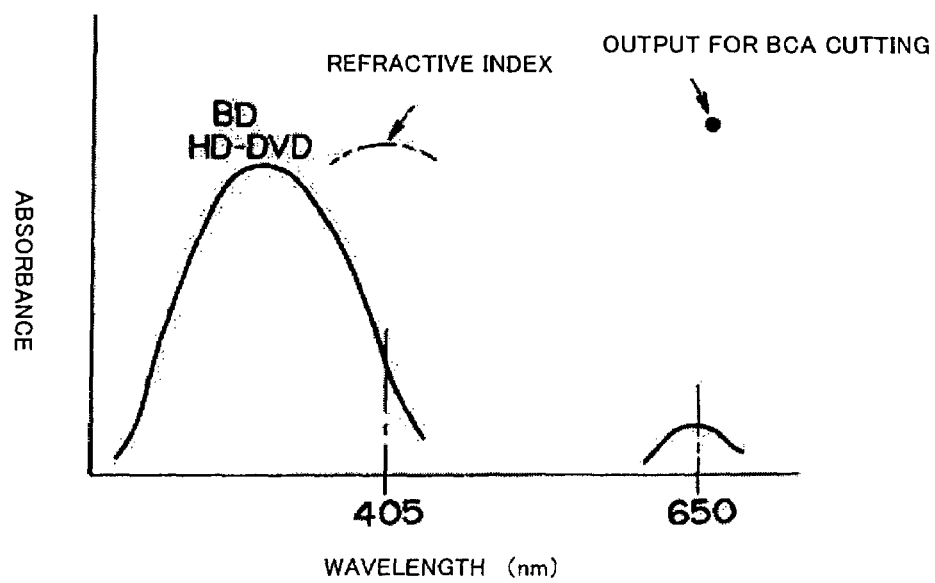
FIG. 6 is a graph of absorbance of the optical recording layer 3 containing the first and the second dyes according to the second embodiment.

FIG. 6 is a graph of absorbance of the optical recording layer 3 containing the first and the second dyes. As shown in the figure, the first dye (the oxacyanine dye) has an absorption spectrum in a wavelength area of a blue laser and, in particular, has an absorption peak on a short wavelength side of a recording wavelength in the wavelength area and is capable of obtaining a high refractive index n.

Moreover, the optical recording layer 3 also has a lower absorption peak in a wavelength area of a red laser because of association of the first dye (the oxacyanine dye) and the second dye (the azo dye) or the second dye (the azo dye). The optical recording layer 3 can also absorb the red laser. Therefore, it is possible to perform BCA with high power using the red laser.

In order to perform the BCA, a dye in the optical recording layer 3 needs to absorb light in a wavelength of a red laser region. Since power of a red laser beam of the red laser region is high compared with power of recording light (a blue laser), only a low concentration or a small amount of the dye is required to perform effective absorption. For example, an amount of the dye is 20 weight % or less, preferably, 5 to 10 weight % with respect to a weight of a base dye.

If loads of an additive dye exceeds 20 weight %, the additive dye adversely affects light absorption of the base dye. As a result, a recording and reproduction characteristic of a BD or an HD-DVD is deteriorated.

If loads of the additive dye is less than 5 weight %, satisfactory light absorption in a light-absorbing band of the additive dye is not obtained. As a result, the BCA cannot be performed.

Note that, in at least one embodiment of the invention, a cyanine dye may be used as the second dye (the additive dye) for the first dye (the base dye, the oxacyanine dye) in FIG. 4.

Figure 7:
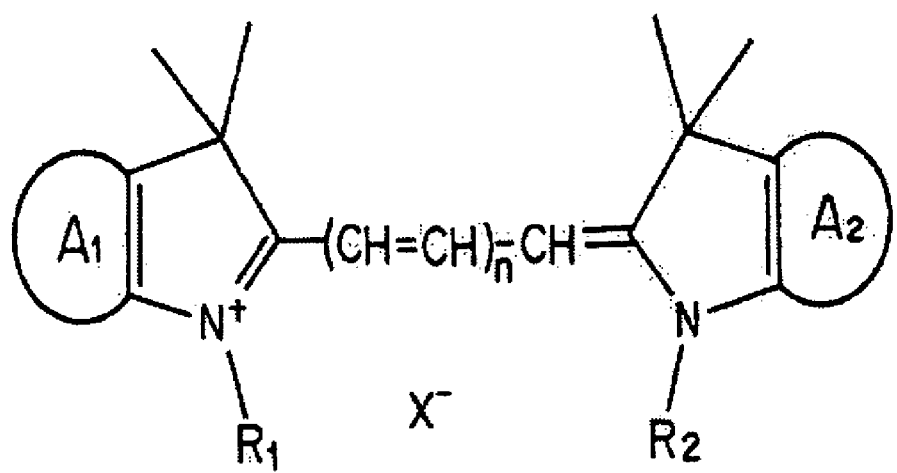
FIG. 7 is a diagram explaining a structural formula of a second dye (an additive dye, a cyanine dye) used for the optical recording layer 3 of an optical information recording medium according to a third embodiment of the invention, wherein n indicates an integer of 1 or 2, a1 and a2 indicate a benzene ring having a phenyl-ethylene group as a substituent, r1 and r2 indicate alkyl group or an alkali metal ion or an alkyl sulfonic acid group bonded with alkyl group, and $x^-$ represents a negative ion of an halogen atom, perchioric acid, boron hydrofluoric acid, or toluenesulfonic acid; when r1 and r2 have groups bonded with alkali metal ions, $x^-$ does not have to be present.

FIG. 7 is a diagram explaining a structural formula of a second dye (an additive dye, a cyanine dye) used for the optical recording layer 3 of an optical information recording medium according to a third embodiment of the invention.

It is possible to obtain an absorption spectrum same as that shown in FIG. 6 by using both the first dye (the oxacyanine dye) and the second dye (the cyanine dye) together as a dye for the optical recording layer 3. It is possible to realize both data logging using a blue laser and BCA using a red laser.

Figure 8:
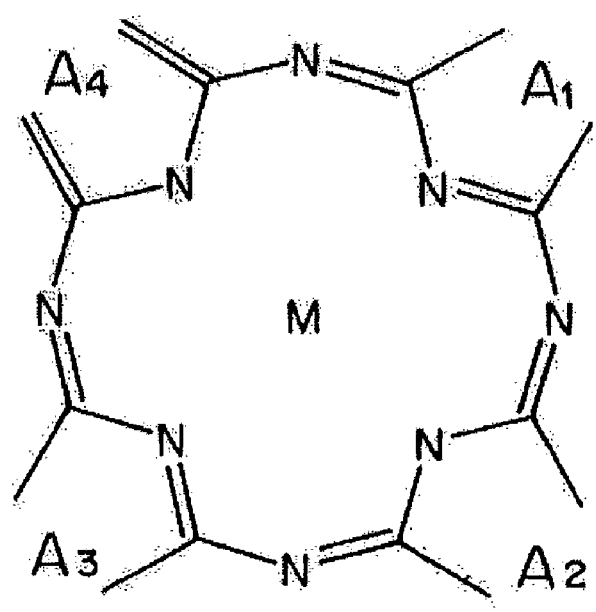
FIG. 8 is a diagram explaining a structural formula of a second dye (an additive dye, a phthalocyanine dye) used for the optical recording layer 3 of an optical information recording medium according to a fourth embodiment of the invention, wherein m represents cu, pd, or co, and a1, a2, a3, and a4 represent substituents independently.

FIG. 8 is a diagram explaining a structural formula of a second dye (an additive dye, a phthalocyanine dye) used for the optical recording layer 3 of an optical information recording medium according to a fourth embodiment of the invention.

It is possible to obtain an absorption spectrum same as that shown in FIG. 6 by using both the first dye (the oxacyanine dye) and the second dye (the phthalocyanine dye) together as a dye for the optical recording layer 3. It is possible to realize both data logging using a blue laser and BCA using a red laser.

Figure 9:
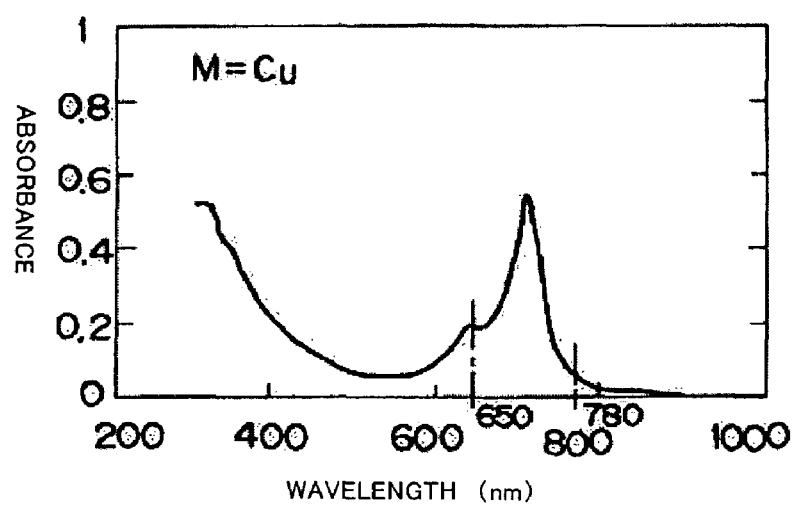
FIG. 9 is a graph of absorbance of the second dye (the phthalocyanine dye) with respect to a wavelength of the laser beam 9 in the case in which M is Cu (copper) and A1 to A4 are phenyl radicals in FIG. 8 according to the fourth embodiment.

FIG. 9 is a graph of absorbance of the second dye (the phthalocyanine dye) with respect to a wavelength of the laser beam 9 in the case in which M is Cu (copper) and A1 to A4 are phenyl radicals in FIG. 8. Since the dye has an absorption capability near a wavelength 650 nm or 780 nm, the dye is capable of absorbing energy of a red laser. Thus, it is possible to divert the BCA device for a CD or a DVD (the writing device for BCA) to the optical information recording medium.

Figure 10:
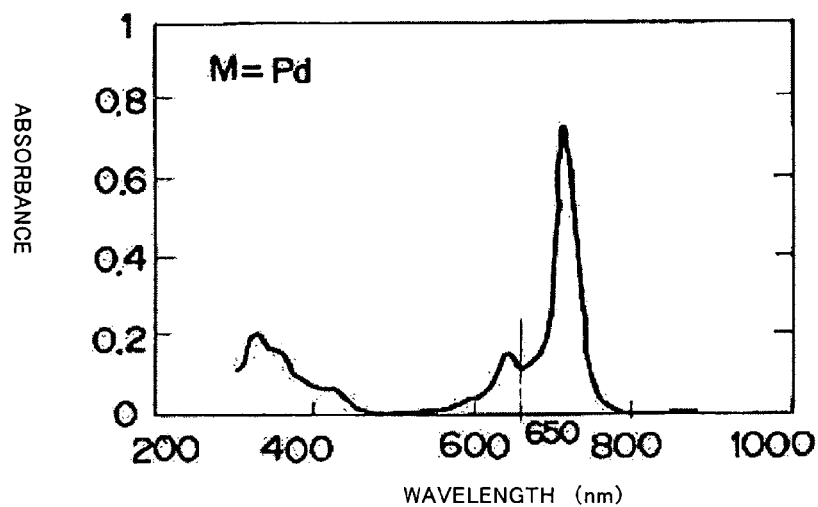
FIG. 10 is a graph of absorbance of the second dye (the phthalocyanine dye) with respect to a wavelength of the laser beam 9 in the case in which M is Pd (palladium) and A1 to A4 are phenyl radicals in FIG. 8 according to the fourth embodiment.

FIG. 10 is a graph of absorbance of the second dye (the phthalocyanine dye) with respect to a wavelength of the laser beam 9 in the case in which M is Pd (palladium) and A1 to A4 are phenyl radicals in FIG. 8. Since the dye has an absorption capability near a wavelength 650 nm, the dye is capable of absorbing energy of a red laser. Thus, it is possible to divert the BCA device for a DVD (the writing device for BCA) to the optical information recording medium.

Figure 11:
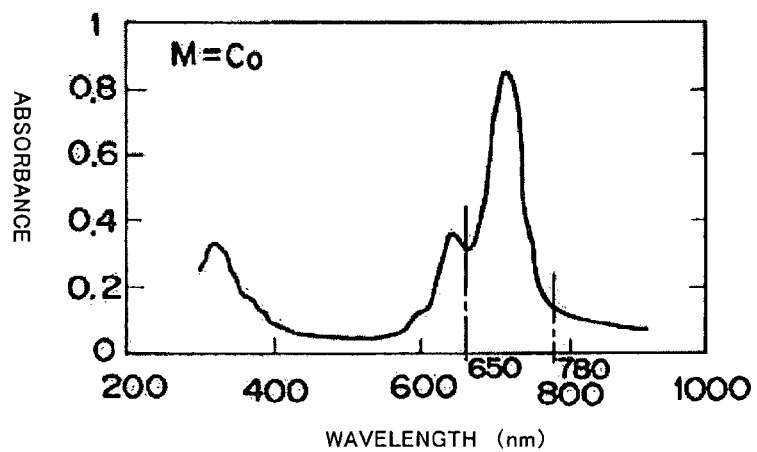
FIG. 11 is a graph of absorbance of the second dye (the phthalocyanine dye) with respect to a wavelength of the laser beam 9 in the case in which M is Co (cobalt) and A1 to A4 are phenyl radicals in FIG. 8 according to the fourth embodiment.

FIG. 11 is a graph of absorbance of the second dye (the phthalocyanine dye) with respect to a wavelength of the laser beam 9 in the case in which M is Co (cobalt) and A1 to A4 are phenyl radicals in FIG. 8. Since the dye has an absorption capability near a wavelength 650 nm or 780 nm, the dye is capable of absorbing energy of a red laser. Thus, it is possible to divert the BCA device for a CD or a DVD (the writing device for BCA) to the optical information recording medium.

A method of applying first and second dyes or a mixed by containing the first and the second dyes on the substrate 2 will be explained with reference to FIGS. 12 and 13.

Figure 12:
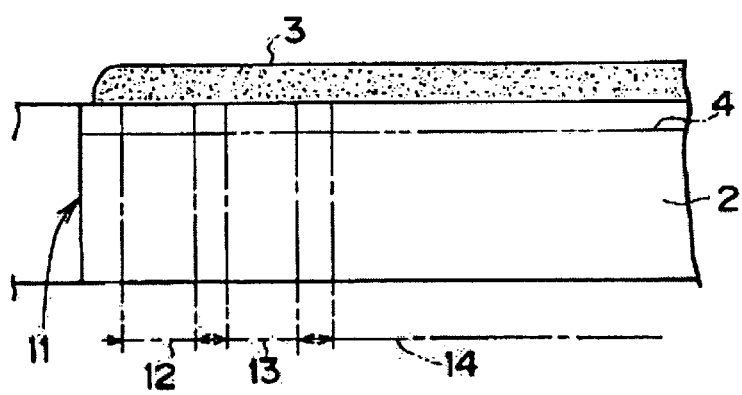
FIG. 12 is a schematic sectional view of a main part showing a first method of applying a dye or a method of manufacturing an optical information recording medium according to a second aspect of the invention.

FIG. 12 is a schematic sectional view of a main part showing a first method of applying a dye or a method of manufacturing an optical information recording medium according to the second aspect of the invention. For example, in order to form the optical recording layer 3 containing the mixed dye on the substrate 2 directly as in the optical information recording medium 1 in FIG. 15 or in order to form the optical recording layer 3 on the substrate 2 via another layer (e.g., the light reflection layer 4 indicated by an imaginary line in FIG. 12) as in the optical information recording medium 20 in FIG. 16, a mixed dye solution obtained by dissolving the dye in a solvent is applied to the substrate 2 by spin coating.

In both the case, it is possible to uniformly apply the dye solution over the sub-information area 12, the system read-in area 13, and the main information area 14 on the substrate 2.

Figure 13:
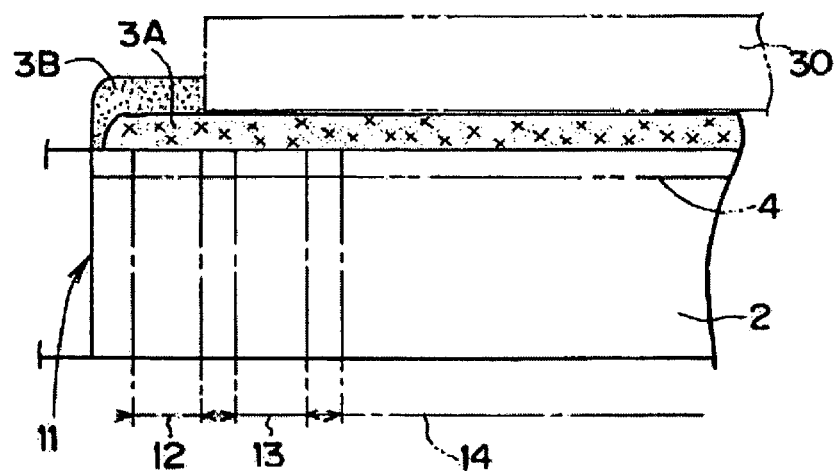
FIG. 13 is a schematic sectional view of a main part showing a second method of applying a dye and a method of manufacturing an optical information recording medium according to a third aspect of the invention.

FIG. 13 is a schematic sectional view of a main part showing a second method of applying a dye and a method of manufacturing an optical information recording medium according to a third aspect of the invention. For example, in order to form the optical recording layer 3 containing the dye on the substrate 2 directly as in the optical information recording medium 1 in FIG. 15 or in order to form the optical recording layer 3 on the substrate 2 via another layer (e.g., the light reflection layer 4 indicated by an imaginary line in FIG. 12) as in the optical information recording medium 20 in FIG. 16, a dye solution obtained by dissolving the dye in a solvent is applied to the substrate 2 by spin coating.

However, after forming a first pigment layer 3A by applying a first dye solution uniformly over the sub-information area 12, the system read-in area 13, and the main information area 14 on the substrate 2, a second pigment layer 3B is formed by applying a second dye solution uniformly only on the sub-information area 12 in a state in which a mask 30 is provided astride the system read-in area 13 and the main information area 14.

Although not shown in the figure, in a third method of applying a pigment or a method of manufacturing an optical information recording medium according to a fourth aspect of the invention, the first pigment layer 3A and the second pigment layer 3B may be applied in a constitution or an order opposite to that shown in FIG. 13.

In other words, it is also possible that, after forming the second pigment layer 3B by applying the second dye solution uniformly only on the sub-information area 12 in a state in which the mask 30 is provided astride the system read-in area 13 and the main information area 14, the first pigment layer 3A is formed by applying the first dye solution uniformly over the system read-in area 13 and the main information area 14 on the substrate 2.

As described above, according to at least one embodiment of the invention, since a material having an absorption peak of a dye further on a short wavelength side than the laser beam 9 for recording and reproduction is used, it is possible to provide an optical information recording medium, which can use an area with a high refractive index n of an organic dye, can attain high sensitization, and can use the writing device for BCA used for a CD or a DVD directly and copes with recording using a blue laser and BCA using a red laser, and a method of manufacturing the same.

In the optical information recording medium and the method of manufacturing the same according to at least one embodiment of the invention, a dye having an absorption peak further on a short wavelength side than a wavelength area of a blue laser and also having an absorption spectrum in a wavelength area of a red laser is selected. Thus, it is possible to perform usual main information recording (data logging) in the main information area at an output level of the blue laser and execute sub-information recording (BCA) in the sub-information area at a higher output level of the red laser.

Therefore, even under the present circumstances in which a high power blue laser semiconductor has not been developed, it is possible to perform the sub-information recording such as the BCA using the conventional semiconductor for a red laser.

In particular, according to the first aspect of the invention, it is possible to perform recording of main information and sub-information of a type different from that of the main information efficiently using the device currently available according to selection or combination of dyes.

In particular, according to the second aspect of the invention, a weight ratio of a first dye and a second dye is selected to apply a mixed dye solution thereof on a substrate. Thus, it is possible to manufacture a disc that makes it possible to perform recording by a blue laser and a red laser.

In particular, according to the third aspect of the invention, an application area of a first dye and an application area of a second dye, which is formed after the application of the first dye, can be demarcated. Thus, it is possible to clearly separate a recording area for recording by a blue laser and a recording area for recording by a red laser.

In the present invention, one of ordinary skill in the art could readily produce the compounds described above or could obtain them from the market.

The present application claims priority to Japanese Patent Application No. 2004-224805, filed Jul. 30, 2004, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium, comprising:
a substrate having translucency;
an optical recording layer comprising a light-absorbing material formed of a dye that absorbs a laser beam; and
a light reflection layer reflecting the laser beam,
wherein the optical information recording medium has (i) a main information area for recording main information that is optically readable by irradiating the laser beam on the optical recording layer, and (ii) a sub-information area separated from the main information area for recording sub-information of a type different from that of the main information by irradiating the laser beam on the optical recording layer,
said light-absorbing material in the optical recording layer having absorption peaks at a wavelength of 350 to 500 nm and at a wavelength of 640 to 680 nm and/or 750 to 830 nm, wherein the light-absorbing material comprises an oxacyanine dye of chemical formula 2 and an azo dye of chemical formula 3:

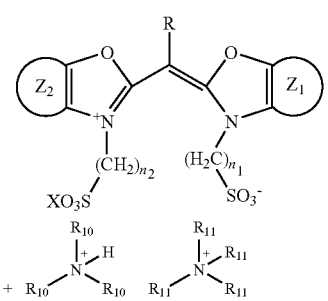

(2)

wherein Z1 and Z2 each represent a group of atoms necessary for forming a five or six-membered aromatic ring and nitrogen-containing heterocyclic ring, which may include a substituent;
R represents a hydrogen atom, halogen, or aliphatic group, an aromatic group, or a heterocyclic ring group;

R10 and R11 each represent any one of methyl group, ethyl group, propyl group, butyl group, pentyl group, and hexyl group, respectively;

X represents an ion necessary for neutralizing electrical charges in a molecule;

n1 and n2 each represent numbers of alkyl chains, which are represented by an integer of 1 to 20,

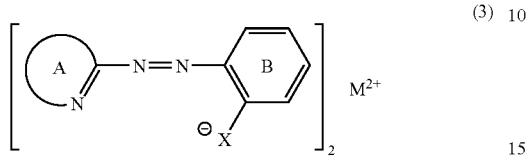

(3)

wherein ring A represents a heterocyclic ring formed together with a carbon atom and a nitrogen atom to which the ring A is bonded;

Ring B represents an aromatic ring that may be substituted or condensed;

X represents a group that can contain active hydrogen which is a metal complex obtained by one molecule of a divalent positive metal ion ($M^{2+}$) to two molecules of this azo dye.

2. An optical information recording medium, comprising:
a substrate having translucency;
an optical recording layer comprising a light-absorbing material formed of a dye that absorbs a laser beam; and
a light reflection layer reflecting the laser beam,
wherein the optical information recording medium has (i) a main information area for recording main information that is optically readable by irradiating the laser beam on the optical recording layer, and (ii) a sub-information area separated from the main information area for recording sub-information of a type different from that of the main information by irradiating the laser beam on the optical recording layer,
said light-absorbing material in the optical recording layer having absorption peaks at a wavelength of 350 to 500 nm and at a wavelength of 640 to 680 nm or 750 to 830 nm,
wherein the light-absorbing material comprises an oxacyanine dye of chemical formula 4 and a cyanine dye of chemical formula 5:

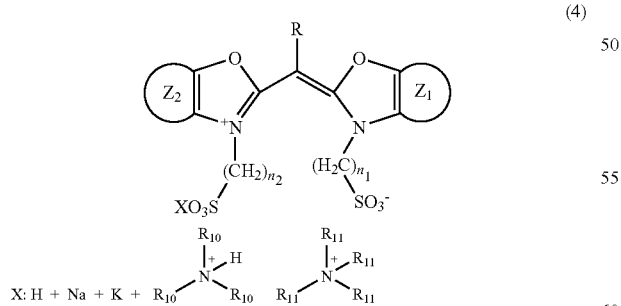

(4)

wherein Z1 and Z2 each represent a group of atoms necessary for forming a five or six-membered aromatic ring and nitrogen-containing heterocyclic ring, which may include a substituent;

R represents a hydrogen atom, halogen, or aliphatic group, an aromatic group, or a heterocyclic ring group;

R10 and R11 each represent any one of methyl group, ethyl group, propyl group, butyl group, pentyl group, and hexyl group, respectively;

X represents an ion necessary for neutralizing electrical charges in a molecule;

n1 and n2 each represent numbers of alkyl chains, which are represented by an integer of 1 to 20,

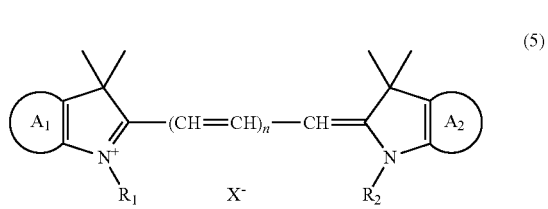

(5)

wherein n represents an integer of 1 or 2;

A1 and A2 each represent a benzene ring having a phenylethylene group as a substituent;

R1 and R2 each represent alkyl group or an alkali metal ion or an alkyl sulfonic acid group bonded with alkyl group;

$X^-$ represents a negative ion of an halogen atom, perchloric acid, boron hydrofluoric acid, or toluenesulfonic acid, proviso that when R1 and R2 have groups bonded with alkali metal ions, $X^-$ does not have to be present.

3. An optical information recording medium, comprising:
a substrate having translucency;
an optical recording layer comprising a light-absorbing material formed of a dye that absorbs a laser beam; and
a light reflection layer reflecting the laser beam,
wherein the optical information recording medium has (i) a main information area for recording main information that is optically readable by irradiating the laser beam on the optical recording layer, and (ii) a sub-information area separated from the main information area for recording sub-information of a type different from that of the main information by irradiating the laser beam on the optical recording layer,
said light-absorbing material in the optical recording layer having absorption peaks at a wavelength of 350 to 500 nm and at a wavelength of 640 to 680 nm or 750 to 830 nm,
wherein the light-absorbing material contains an oxacyanine dye of chemical formula 6 and a phthalocyanine dye of chemical formula 7:

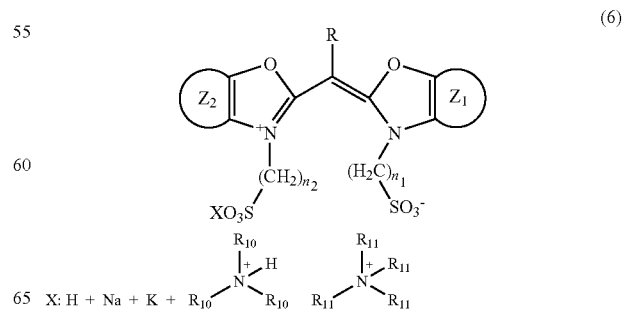

(6)

wherein Z1 and Z2 each represent a group of atoms necessary for forming a five or six-membered aromatic ring and nitrogen-containing heterocyclic ring, which may include a substituent;

R represents a hydrogen atom, halogen, or aliphatic group, an aromatic group, or a heterocyclic ring group;

R10 and R11 each represent any one of methyl group, ethyl group, propyl group, butyl group, pentyl group, and hexyl group;

X represents an ion necessary for neutralizing electrical charges in a molecule;

n1 and n2 each represent numbers of alkyl chains, which are represented by an integer of 1 to 20,

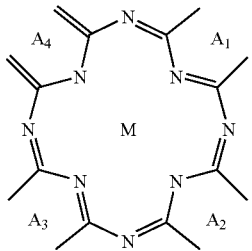

(7)

wherein M represents Cu, Pd, or Co, and A1, A2, A3, and A4 each represent substituents.

* * * * *